(12) United States Patent
Liu

(10) Patent No.: US 11,343,708 B2
(45) Date of Patent: May 24, 2022

(54) DATA TRANSMISSION METHOD AND DEVICE, AND COMPUTER STORAGE MEDIUM

(71) Applicant: GUANGDONG OPPO MOBILE TELECOMMUNICATIONS CORP., LTD., Dongguan (CN)

(72) Inventor: Jianhua Liu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 22 days.

(21) Appl. No.: 16/897,118

(22) Filed: Jun. 9, 2020

(65) Prior Publication Data

US 2020/0305020 A1 Sep. 24, 2020

Related U.S. Application Data

(63) Continuation of application No. PCT/CN2017/119118, filed on Dec. 27, 2017.

(51) Int. Cl.
*H04W 28/02* (2009.01)
*H04W 76/25* (2018.01)
(Continued)

(52) U.S. Cl.
CPC ............ *H04W 28/0273* (2013.01); *H04W 28/0268* (2013.01); *H04W 76/11* (2018.02); *H04W 76/25* (2018.02); *H04W 76/27* (2018.02)

(58) Field of Classification Search
CPC ............ H04W 28/0273; H04W 76/25; H04W 76/11; H04W 76/27; H04W 28/0268;
(Continued)

(56) References Cited

U.S. PATENT DOCUMENTS

2009/0016351 A1* 1/2009 Patel ............... H04L 1/0083
370/392
2019/0053092 A1* 2/2019 Chun ............... H04W 76/12
(Continued)

FOREIGN PATENT DOCUMENTS

CN 102761905 A 10/2012
CN 106332176 A 1/2017
(Continued)

OTHER PUBLICATIONS

3GPP TSG RAN WG2#100; R2-1712481; Source: MediaTek Inc; Title: SDAP header design based on NAS 5G QoS requirements, Reno, Nevada, USA, Nov. 27-Dec. 1, 2017. (Year: 2017).*
(Continued)

*Primary Examiner* — Hassan A Phillips
*Assistant Examiner* — Mohammed S Chowdhury
(74) *Attorney, Agent, or Firm* — Morgan, Lewis & Bockius LLP

(57) ABSTRACT

Disclosed in the present invention are a data transmission method and device, and a computer storage medium, the method comprising: a terminal transmits data and attribute information corresponding to the data to a network; and the network transmits data and attribute information corresponding to the data to the terminal, the attribute information corresponding to the data comprising at least one of the following: quality of service (QoS) stream information, protocol data unit (PDU) session information, network slice information, external network information for data transmission and identification information of the terminal.

3 Claims, 3 Drawing Sheets

(51) Int. Cl.
*H04W 76/11* (2018.01)
*H04W 76/27* (2018.01)

(58) Field of Classification Search
CPC .............. H04W 8/00; H04W 28/06; H04W 28/0252; H04W 72/1284; H04L 47/24
See application file for complete search history.

(56) References Cited

U.S. PATENT DOCUMENTS

| | | | |
|---|---|---|---|
| 2019/0116518 A1* | 4/2019 | Stojanovski | H04W 28/0257 |
| 2019/0230725 A1* | 7/2019 | Lou | H04W 76/27 |
| 2020/0120738 A1* | 4/2020 | Kawasaki | H04W 28/06 |
| 2020/0128505 A1* | 4/2020 | Lu | H04W 8/24 |
| 2020/0260336 A1* | 8/2020 | Wu | H04W 36/0033 |
| 2020/0275302 A1* | 8/2020 | Youn | H04W 28/06 |

FOREIGN PATENT DOCUMENTS

| | | |
|---|---|---|
| CN | 106572516 A | 4/2017 |
| CN | 107018542 A | 8/2017 |
| CN | 108307516 A | 7/2018 |
| WO | WO2017/027071 A1 | 2/2017 |

OTHER PUBLICATIONS

3GPP TSG-RAN WG2#100 Meeting; R2-1712393; Source: Huawei, HiSilicon; Title: Further discussion on SDAP Header Format, Reno, Nevada, US, Nov. 27-Dec. 1, 2017. (Year: 2017).*
3GPP TSG-RAN2 Meeting #100; R2-1713669; Source: LG Electronics Inc.; Title: SDAP header format; Reno, USA, Nov. 27-Dec. 1, 2017. (Year: 2017).*
3GPP TSG-RAN2 #100; R2-1712377 ; Source: Xiaomi; Title: Consideration on reflective QoS of SDAP, Reno, Nevada, Nov. 27-Dec. 1, 2017 (Year: 2017).*
Guangdong OPPO Mobil Telecommunications Corp. Ltd., International Search Report and Written Opinion, PCT/CN2017/119118, dated Sep. 25, 2018, 9 pgs.
Guangdong OPPO Mobile Telecommunications Corp. Ltd., Extended European Search Report, EP17936828.7, dated Nov. 16, 2020, 8 pgs.
Convida Wireless, SDAP Header Format, 3GPP TSG-RAN WG2 NR Ad Hoc, R2-1707351, Quingdao, China, Jun. 27-29, 2017, 5 pgs.
Huawei et al., Updates for T5 Small Data Service, SA WG2 Meeting #96, S2-131508, Apr. 8-12, 2013, San Diego, California, USA, 7 pgs.
3GPP TS 36.300 V14.2.0 (Mar. 2017), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), 330 pgs.
3GPP TS 23.501 V0.4.0 (Apr. 2017), 3rd Generation Partnership Project; Technical Specification Group Services and System Aspects; System Architecture for the 5G System; Stage 2 (Release 15), 123 pgs.
CATT, NR SDAP header format, 3GPP TSG-RAN WG2 Meeting #NR AH2, R2-1706381, Qingdao, China, Jun. 27-29, 2017, 3 pgs.
Guangdong OPPO Mobile Telecommunications Corp. Ltd., Examination Report, IN202017028942, dated Sep. 7, 2021, 6 pgs.
Guangdong OPPO Mobile Telecommunications Corp. Ltd., Notice of Reasons for Refusal, JP2020-535960, dated Nov. 4, 2021, 6 pgs.
LG Electronics, TS 23.502: Alignment of N1 SM information/container, SA WG2 Meeting #122E e-meeting, S2-176767, Sep. 11-15, 2017, Elbonia, 16 pgs.
LG Electronics, Interim agreement on infrequent small data transmission transferrin NextGen system, SA WG2 Meeting #117, S2-165749, Oct. 17-21, 2016, Kaohsiung, Taiwan, 3 pgs.
Guangdong Oppo Mobil Telecommunications Corp. Ltd., Notice of Reasons for Refusal, JP2020-535960, Feb. 22, 2022, 6 pgs.
ZTE, ZTE Microelectronics, "Consideration on reflective QoS indication," 3GPP TSG-RAN WG2 NR Ad Hoc, R2-1700160, Spokane, Washington, USA, Jan. 17-19, 2017, 5 pgs.

* cited by examiner

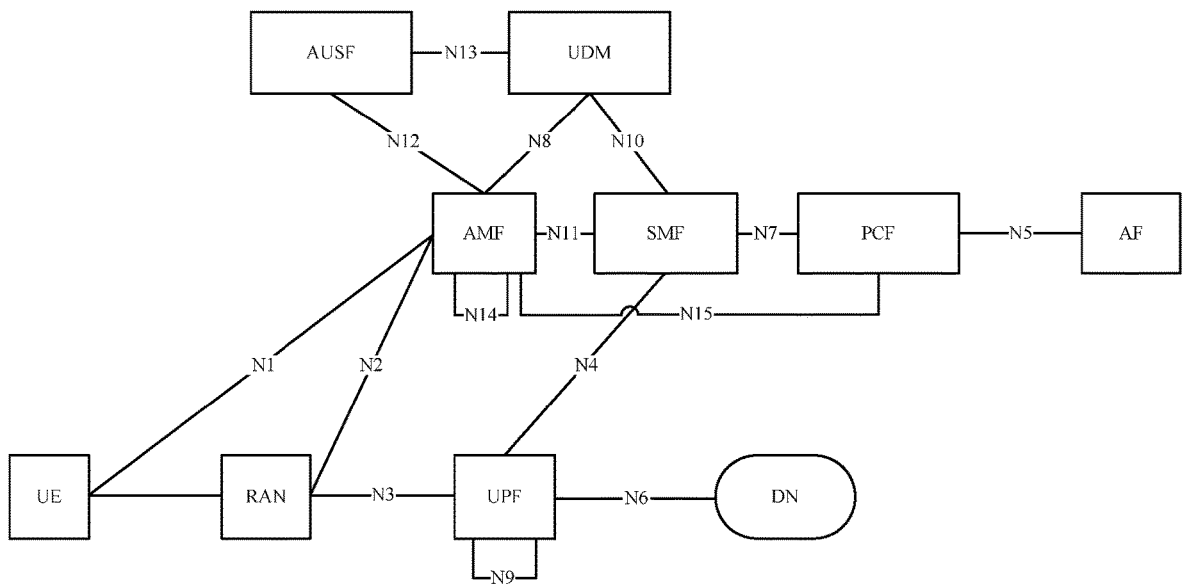

Fig. 1

| A terminal transmits data and attribute information corresponding to the data to a network, wherein the attribute information corresponding to the data comprises at least one of the following: quality of service (QoS) stream information, protocol data unit (PDU) session information, network slice information, external network information for data transmission and identification information of the terminal | 201 |

Fig. 2

| Network transmits data and attribute information corresponding to the data to a terminal; wherein, the attribute information corresponding to the data includes at least one of the followings: QoS flow information, PDU session information, network slice information, external network information for data transmission, and identification information of the terminal | 301 |

Fig. 3

DATA TRANSMISSION METHOD AND DEVICE, AND COMPUTER STORAGE MEDIUM

CROSS-REFERENCE TO RELATED APPLICATION

This application is a continuation of PCT Application No. PCT/CN2017/119118, filed Dec. 27, 2017, the entire content of which is incorporated herein by reference in its entirety.

TECHNICAL FIELD

The present disclosure relates to the field of wireless communication technologies, and more particularly, to a data transmission method and device, and a computer storage medium.

BACKGROUND

In a small data transmission mode of long term evolution (LTE), infrequent small data may be transmitted in a control plane, where the small data is encapsulated in a Protocol Data Unit (PDU) of a Non-Access Stadium (NAS), and is transmitted in the control plane through a NAS message.

In the existing protocol, when the small data is transmitted by the terminal and a network side through the control plane, bearer information of such data will be carried. The data has no bearer information in a 5th Generation (5G) mobile communication system, and relatively speaking, the following associated information of the data is introduced: PDU session information, Quality of Service (QoS) flow information, network slice information, and the like. How to indicate the above associated information of the data in the 5G system so as to transmit the data smoothly is an issue to be solved.

SUMMARY

In order to solve the foregoing technical problems, the embodiments of the present disclosure provide a data transmission method and device, and a computer storage medium.

A data transmission method provided by an embodiment of the present disclosure includes:

transmitting, by a terminal, data and attribute information corresponding to the data to a network; wherein, the attribute information corresponding to the data includes at least one of followings:

QoS flow information, PDU session information, network slice information, external network information for data transmission, and identification information of the terminal.

In the embodiment of the present disclosure, the transmitting, by the terminal, the data and the attribute information corresponding to the data to the network includes:

transmitting, by the terminal, a first PDU to an access network element, the first PDU including: a first header and a second PDU;

wherein, the first header includes the attribute information corresponding to the data, and the second PDU includes the data.

In the embodiment of the present disclosure, the transmitting, by the terminal, the data and the attribute information corresponding to the data to the network includes:

transmitting, by the terminal, a first PDU to an access network element, the first PDU including: a first header and a second PDU;

wherein, the second PDU includes the attribute information corresponding to the data and the data.

In the embodiment of the present disclosure, the first PDU is a RRC PDU; and the second PDU is a non-access stratum NAS PDU.

A data transmission method provided by an embodiment of the present disclosure includes:

transmitting, by a network, data and attribute information corresponding to the data to a terminal; wherein, the attribute information corresponding to the data includes at least one of the followings:

QoS flow information, PDU session information, network slice information, external network information for data transmission, and identification information of the terminal.

In the embodiment of the present disclosure, the transmitting, by the network, the data and the attribute information corresponding to the data to the terminal includes:

transmitting, by a core network element, a third PDU to an access network element, the third PDU including: a second header and a second PDU; wherein, the second header includes the attribute information corresponding to the data, and the second PDU includes the data; and parsing the attribute information corresponding to the data from the second header of the third PDU, encapsulating a first PDU and transmitting the first PDU to the terminal, by the access network element, the first PDU including: a first header and the second PDU; wherein, the first header includes the attribute information corresponding to the data.

In the embodiment of the present disclosure, the transmitting, by the network, the data and the attribute information corresponding to the data to the terminal includes:

transmitting, by a core network element, a third PDU to an access network element, the third PDU including: a second header and a second PDU; wherein, the second PDU includes the attribute information corresponding to the data and the data; and encapsulating a first PDU based on the third PDU and transmitting the first PDU to the terminal, by the access network element, the first PDU including: a first header and the second PDU.

In the embodiment of the present disclosure, the first PDU is a RRC PDU; the second PDU is a NAS PDU; and the third PDU is an $N_2$—C PDU.

A data transmission method provided by an embodiment of the present disclosure includes:

receiving, by a network, data and attribute information corresponding to the data transmitted by a terminal; wherein, the attribute information corresponding to the data includes at least one of followings: QoS flow information, PDU session information, network slice information, external network information for data transmission, and identification information of the terminal; and establishing, or activating or modifying a path configuration of a core network according to the attribute information of the data, and transmitting the data to an external network based on the path configuration, by the network.

In the embodiment of the present disclosure, the receiving, by the network, the data and the attribute information corresponding to the data transmitted by the terminal includes:

receiving, by an access network element, a first PDU transmitted by the terminal, the first PDU including: a first header and a second PDU; wherein, the first header includes the attribute information corresponding to the data, and the second PDU includes the data; and parsing the attribute information corresponding to the data from the first header of the first PDU, encapsulating a third PDU and transmitting the third PDU to a core network element, by the access network element, the third PDU including: a second header and the second PDU; wherein, the second header includes the attribute information corresponding to the data.

In the embodiment of the present disclosure, the receiving, by the network, the data and the attribute information corresponding to the data transmitted by the terminal includes:

receiving, by an access network element, a first PDU transmitted by the terminal, the first PDU including: a first header and a second PDU; wherein, the second PDU includes the attribute information corresponding to the data and the data; and encapsulating a third PDU based on the first PDU and transmitting the third PDU to a core network element, by the access network element, the third PDU including: a second header and the second PDU.

In the embodiment of the present disclosure, the first PDU is a RRC PDU; the second PDU is a NAS PDU; and the third PDU is an $N_2$—C PDU.

A data transmission device provided by an embodiment of the present disclosure includes:

a transmission unit configured to transmit data and attribute information corresponding to the data to a network; wherein, the attribute information corresponding to the data includes at least one of followings:

QoS flow information, PDU session information, network slice information, external network information for data transmission, and identification information of the terminal.

In the embodiment of the present disclosure, the transmission unit is configured to transmit a first PDU to an access network element, the first PDU including: a first header and a second PDU;

wherein, the first header includes the attribute information corresponding to the data, and the second PDU includes the data.

In the embodiment of the present disclosure, the transmission unit is configured to transmit a first PDU to an access network element, the first PDU including: a first header and a second PDU;

wherein, the second PDU includes the attribute information corresponding to the data and the data.

In the embodiment of the present disclosure, the first PDU is a RRC PDU; and the second PDU is a NAS PDU.

A data transmission device provided by an embodiment of the present disclosure includes:

a transmission unit configured to transmit data and attribute information corresponding to the data to a terminal; wherein, the attribute information corresponding to the data includes at least one of the followings:

QoS flow information, PDU session information, network slice information, external network information for data transmission, and identification information of the terminal.

In an embodiment of the present disclosure, the transmission unit includes:

an access network transmission unit configured to transmit a third PDU to an access network element, the third PDU including: a second header and a second PDU; wherein, the second header includes the attribute information corresponding to the data, and the second PDU includes the data; and a core network transmission unit configured to parse the attribute information corresponding to the data from the second header of the third PDU, encapsulate a first PDU and transmit the first PDU to the terminal, the first PDU including: a first header and the second PDU; wherein, the first header includes the attribute information corresponding to the data.

In the embodiment of the present disclosure, the transmission unit includes:

an access network transmission unit configured to transmit a third PDU to an access network element, the third PDU including: a second header and a second PDU; wherein, the second PDU includes the attribute information corresponding to the data and the data; and a core network transmission unit configured to encapsulate a first PDU based on the third PDU and transmit the first PDU to the terminal, the first PDU including: a first header and the second PDU.

In the embodiment of the present disclosure, the first PDU is a RRC PDU; the second PDU is a NAS PDU; and the third PDU is an $N_2$—C PDU.

A data transmission device provided by an embodiment of the present disclosure includes:

a transmission unit configured to receive data and attribute information corresponding to the data transmitted by a terminal; wherein, the attribute information corresponding to the data includes at least one of the followings: QoS flow information, PDU session information, network slice information, external network information for data transmission, and identification information of the terminal; and establish, or activate or modify a path configuration of a core network according to the attribute information of the data, and transmit the data to an external network based on the path configuration.

In the embodiment of the present disclosure, the transmission unit includes:

an access network transmission unit configured to receive a first PDU transmitted by the terminal, the first PDU including: a first header and a second PDU; wherein, the first header includes the attribute information corresponding to the data, and the second PDU includes the data; and parse the attribute information corresponding to the data from the first header of the first PDU, encapsulate a third PDU and transmit the third PDU to a core network element, the third PDU including: a second header and the second PDU; wherein, the second header includes the attribute information corresponding to the data; and a core network transmission unit configured to establish, or activate or modify a path configuration of a core network according to the attribute information of the data, and transmit the data to an external network based on the path configuration.

In the embodiment of the present disclosure, the transmission unit includes:

an access network transmission unit configured to receive a first PDU transmitted by the terminal, the first PDU including: a first header and a second PDU; wherein, the second PDU includes the attribute information corresponding to the data and the data; and encapsulate a third PDU based on the first PDU and transmit the third PDU to a core network element, the third PDU including: a second header and the second PDU; and a core network transmission unit configured to establish, or activate or modify a path configuration of a core network according to the attribute information of the data, and transmit the data to an external network based on the path configuration.

In the embodiment of the present disclosure, the first PDU is a RRC PDU; the second PDU is a NAS PDU; and the third PDU is an $N_2$—C PDU.

An embodiment of the present disclosure provides a computer storage medium storing a computer-executable instruction thereon, wherein the computer-executable instruction, when executed by a processor, implements the above-mentioned data transmission method.

In the technical solutions of the embodiments of the present disclosure, the terminal transmits the data and the attribute information corresponding to the data to the network. The network transmits the data and the attribute information corresponding to the data to the terminal. The attribute information corresponding to the data includes at least one of the followings: the QoS flow information, the PDU session information, the network slice information, the external network information for data transmission, and the identification information of the terminal. By means of the technical solutions of the embodiments of the present disclosure, the attribute information of the data is also transmitted while the data is transmitted in the 5G system, thus ensuring smooth transmission of the data according to a desired path.

BRIEF DESCRIPTION OF THE DRAWINGS

The accompanying drawings illustrated here serve to provide a further understanding of the present disclosure and constitute a part of the present application, and the illustrative embodiments of the present disclosure and together with the description thereof serve to explain the present disclosure, but do not constitute inappropriate definition to the present disclosure. In the drawings:

FIG. 1 is a system frame diagram of a 5G network according to an embodiment of the present disclosure;

FIG. 2 is a first flow chart of a data transmission method according to an embodiment of the present disclosure;

FIG. 3 is a second flow chart of a data transmission method according to an embodiment of the present disclosure;

DETAILED DESCRIPTION

Figure 4:
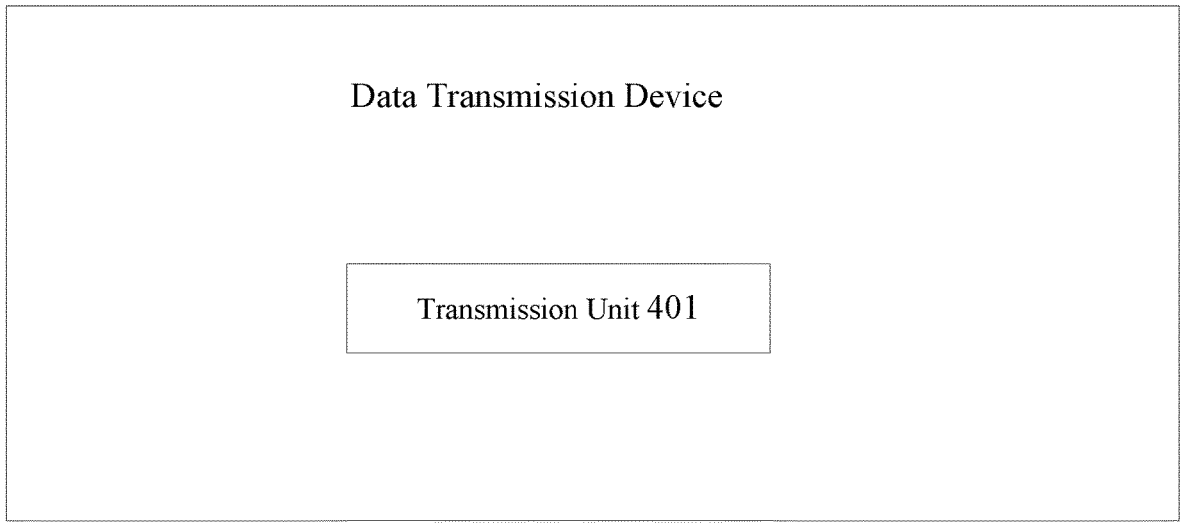
FIG. 4 is a first schematic diagram of a structural composition of a data transmission device according to an embodiment of the present disclosure.

In order to understand the features and technical contents of the embodiments of the present disclosure in more detail, the implementation of the embodiments of the present disclosure will be described in detail below with reference to the attached drawings, which are for reference only and are not intended to limit the embodiments of the present disclosure.

FIG. 1 is a system frame diagram of a 5G network according to an embodiment of the present disclosure. As shown in FIG. 1, devices involved in a 5G network system include:

a terminal (UE, User Equipment), a Radio Access Network (RAN), a User Plane Function (UPF), a Data Network (DN), a Core Access and Mobility Management Function (AMF), a Session Management Function (SMF), a Policy Control Function (PCF), an Application Function (AF), an Authentication Server Function (AUSF), and Unified Data Management (UDM).

In the 5G system, each UE may establish one or more PDU sessions, each PDU session may include a plurality of QoS flows, and one network slice may have a plurality of PDU sessions. Therefore, when data is transmitted, it is necessary to indicate which QoS flow, which PDU session and which network slice that the data belongs to.

The above example shown in FIG. 1 is only a network structure example for implementing the embodiment of the present disclosure, and the embodiment of the present disclosure is not limited to the network structure shown in FIG. 1.

FIG. 2 is a first flow chart of a data transmission method according to an embodiment of the present disclosure. As shown in FIG. 2, the data transmission method including the following step.

In step 201: a terminal transmits data and attribute information corresponding to the data to a network; where the attribute information corresponding to the data includes at least one of the followings: QoS flow information, PDU session information, network slice information, external network information for data transmission, and identification information of the terminal.

In the embodiment of the present disclosure, the terminal may be any device that can communicate with the network, such as a mobile phone, a tablet computer, a notebook computer, and a desktop.

In the embodiment of the present disclosure, when the terminal transmits the data to the network, the attribute information of the data is transmitted to the network together. Further, the data and the attribute information of the data may be transmitted in the following manners.

In a first manner, the terminal transmits a first PDU to an access network element, the first PDU including: a first header and a second PDU; where the first header includes the attribute information corresponding to the data, and the second PDU includes the data.

For example, after receiving the data sent by an upper layer, a NAS of the terminal encapsulates a NAS PDU (corresponding to the second PDU), and then encapsulates a RRC PDU (corresponding to the first PDU) through a RRC layer, where the RRC PDU includes a RRC header and the NAS PDU. In the embodiment of the present disclosure, the attribute information corresponding to the data may be carried in the RRC header. Thereafter, lower layer protocols (for example, PDCP layer, RLC layer, MAC layer and PHY layer) are encapsulated and transmitted to the access network element.

The access network element receives the first PDU transmitted by the terminal, the first PDU including: a first header and a second PDU; where the first header includes the attribute information corresponding to the data, and the second PDU includes the data; and the access network element parses the attribute information corresponding to the data from the first header of the first PDU, encapsulates a third PDU and transmits the third PDU to a core network element, the third PDU including: a second header and the second PDU; where the second header includes the attribute information corresponding to the data.

After receiving the third PDU, the core network element parses the attribute information corresponding to the data from the second header of the third PDU, establishes or activates or modifies a path configuration of the core network according to the attribute information of the data, and transmits the data to an external network based on the path configuration.

In the foregoing solution, the core network element may be a control element of the core network.

In a second manner, the terminal transmits a first PDU to an access network element, the first PDU including: a first header and a second PDU; where the second PDU includes the attribute information corresponding to the data and the data.

For example, after receiving the data sent by an upper layer, an NAS of the terminal encapsulates a NAS PDU (corresponding to the second PDU). According to the embodiment of the present disclosure, the attribute information corresponding to the data may be carried in the NAS PDU. Then, a RRC PDU (corresponding to the first PDU) is encapsulated through a RRC layer, where the RRC PDU includes a RRC header and a NAS PDU. Thereafter, the lower layer protocols (for example, PDCP layer, RLC layer, MAC layer and PHY layer) are encapsulated and transmitted to the access network element.

The access network element receives the first PDU transmitted by the terminal, the first PDU including: a first header and a second PDU; wherein, the second PDU includes the attribute information corresponding to the data and the data; and the access network element encapsulates a third PDU based on the first PDU and transmits the third PDU to a core network element, the third PDU including: a second header and the second PDU.

After receiving the third PDU, the core network element parses the second PDU from the third PDU, parses the attribute information corresponding to the data from the second PDU, establishes or activates or modifies a path configuration of the core network according to the attribute information of the data, and transmits the data to an external network based on the path configuration.

In the foregoing solution, the core network element may be a control element of the core network.

In the embodiment of the present disclosure, the attribute information corresponding to the data includes at least one of the followings: QoS flow information, PDU session information, network slice information, external network information for data transmission, and identification information of the terminal.

In one embodiment, the QoS flow information may be identification information of a QoS flow where the data is located.

In one embodiment, the PDU session information may be session identification information of a PDU session where the data is located.

In one embodiment, the network slice information may be identification information of a network slice where the data is located, and/or type information of the network slice.

In one embodiment, the external network information for data transmission may be identification or address information of the data network.

FIG. 3 is a second flow chart of a data transmission method according to an embodiment of the present disclosure. As shown in FIG. 3, the data transmission method including the following step.

In step 301, a network transmits data and attribute information corresponding to the data to a terminal; where the attribute information corresponding to the data includes at least one of the followings: QoS flow information, PDU session information, network slice information, external network information for data transmission, and identification information of the terminal.

In the embodiment of the present disclosure, the network refers to a network entity at a network side, where the network entity includes two parts, one is a core network element, and the other is an access network element.

In the embodiment of the present disclosure, when the network transmits the data to the terminal, the attribute information of the data is transmitted to the terminal together. Further, the data and the attribute information of the data may be transmitted in the following manners.

In a first manner, a core network element transmits a third PDU to an access network element, the third PDU including: a second header and a second PDU; where the second header includes the attribute information corresponding to the data, and the second PDU includes the data. The access network element parses the attribute information corresponding to the data from the second header of the third PDU, encapsulates a first PDU and transmits the first PDU to the terminal, the first PDU including: a first header and the second PDU; where the first header includes the attribute information corresponding to the data.

In a second manner, a core network element transmits a third PDU to an access network element, the third PDU including: a second header and a second PDU; where the second PDU includes the attribute information corresponding to the data and the data; and the access network element encapsulates a first PDU based on the third PDU and transmits the first PDU to the terminal, the first PDU including: a first header and the second PDU.

In the foregoing solution, the first PDU is a RRC PDU; the second PDU is a NAS PDU; and the third PDU is an $N_2$—C PDU.

FIG. 4 is a first schematic diagram of a structural composition of a data transmission device according to an embodiment of the present disclosure. The data transmission device of the embodiment is applied to a terminal side. As shown in FIG. 4, the data transmission device includes:

a transmission unit 401 configured to transmit data and attribute information corresponding to the data to a network; where the attribute information corresponding to the data includes at least one of the followings:

QoS flow information, PDU session information, network slice information, external network information for data transmission, and identification information of the terminal.

In one embodiment, the transmission unit 401 is configured to transmit a first PDU to an access network element, the first PDU including: a first header and a second PDU; where the first header includes the attribute information corresponding to the data, and the second PDU includes the data.

In one embodiment, the transmission unit 401 is configured to transmit a first PDU to an access network element, the first PDU including: a first header and a second PDU; where the second PDU includes the attribute information corresponding to the data and the data.

In the foregoing solution, the first PDU is a RRC PDU; and the second PDU is a NAS PDU.

It should be understood by those skilled in the art that the implementation function of each unit in the data transmission device shown in FIG. 4 may be understood with reference to the relevant description of the foregoing data transmission method. The functions of each unit in the data transmission device shown in FIG. 4 may be implemented by a program running on a processor, and may also be implemented by a specific logic circuit.

Figure 5:
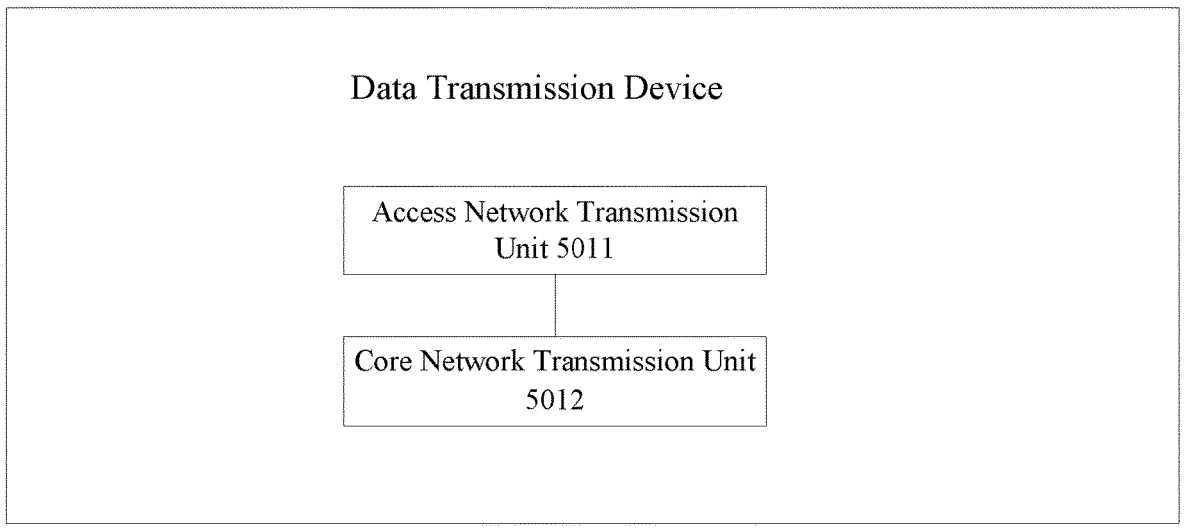
FIG. 5 is a second schematic diagram of a structural composition of a data transmission device according to an embodiment of the present disclosure.

FIG. 5 is a second schematic diagram of a structural composition of a data transmission device according to an embodiment of the present disclosure. The data transmission device of the embodiment is applied to a network side. As shown in FIG. 5, the data transmission device includes:

a transmission unit 501 configured to receive data and attribute information corresponding to the data transmitted by a terminal; where the attribute information corresponding to the data includes at least one of the followings:

QoS flow information, PDU session information, network slice information, external network information for data transmission, and identification information of the terminal.

In one embodiment, the transmission unit 501 further includes:

an access network transmission unit 5011 configured to receive a first PDU transmitted by the terminal, the first PDU including: a first header and a second PDU; where the first header includes the attribute information corresponding to the data, and the second PDU includes the data; and parse the attribute information corresponding to the data from the first header of the first PDU, encapsulate a third PDU and transmit the third PDU to a core network element, the third PDU including: a second header and the second PDU; where the second header includes the attribute information corresponding to the data; and a core network transmission unit 5012 configured to establish, or activate or modify a path configuration of a core network according to the attribute information of the data, and transmit the data to an external network based on the path configuration.

In one embodiment, the transmission unit 501 further includes:

an access network transmission unit 5011 configured to transmit a third PDU to an access network element, the third PDU including: a second header and a second PDU; wherein, the second PDU includes the attribute information corresponding to the data and the data; and a core network transmission unit 5012 configured to encapsulate a first PDU based on the third PDU and transmit the first PDU to the terminal, the first PDU including: a first header and the second PDU.

In the foregoing solution, the first PDU is a RRC PDU; the second PDU is a NAS PDU; and the third PDU is an $N_2$—C PDU.

The foregoing solution is with respect to downlink transmission at a network side. It is noteworthy that the access network transmission unit 5011 may be arranged in an access network element to implement, and the core network transmission unit 5012 may be arranged in a core network element to implement. The following describes uplink receiving at the network side, and it should be understood that the uplink receiving at the network side corresponds to uplink transmission at the terminal side.

The transmission unit 501 is configured to receive data and attribute information corresponding to the data transmitted by a terminal; where the attribute information corresponding to the data includes at least one of the followings: QoS flow information, PDU session information, network slice information, external network information for data transmission, and identification information of the terminal; and establish, or activate or modify a path configuration of a core network according to the attribute information of the data, and transmit the data to an external network based on the path configuration.

In one embodiment, the transmission unit 501 further includes:

an access network transmission unit 5011 configured to receive a first PDU transmitted by the terminal, the first PDU including: a first header and a second PDU; where the first header includes the attribute information corresponding to the data, and the second PDU includes the data; and parse the attribute information corresponding to the data from the first header of the first PDU, encapsulate a third PDU and transmit the third PDU to a core network element, the third PDU including: a second header and the second PDU; wherein, the second header includes the attribute information corresponding to the data; and a core network transmission unit 5012 configured to establish, or activate or modify a path configuration of a core network according to the attribute information of the data, and transmit the data to an external network based on the path configuration.

In one embodiment, the transmission unit 501 further includes:

an access network transmission unit 5011 configured to receive a first PDU transmitted by the terminal, the first PDU including: a first header and a second PDU; where the second PDU includes the attribute information corresponding to the data and the data; and encapsulate a third PDU based on the first PDU and transmit the third PDU to a core network element, the third PDU including: a second header and the second PDU; and a core network transmission unit 5012 configured to establish, or activate or modify a path configuration of a core network according to the attribute information of the data, and transmit the data to an external network based on the path configuration.

In the foregoing solution, the first PDU is a RRC PDU; the second PDU is a NAS PDU; and the third PDU is an $N_2$—C PDU.

It should be understood by those skilled in the art that the implementation function of each unit in the data transmission device shown in FIG. 5 may be understood with reference to the relevant description of the foregoing data transmission method. The functions of each unit in the data transmission device shown in FIG. 5 may be implemented by a program running on a processor, and may also be implemented by a specific logic circuit.

The above data transmission device according to the embodiments of the present disclosure may also be stored in a computer-readable storage medium if being implemented in the form of a software function module and sold or used as an independent product. Based on such understanding, the essence of the technical solutions of the embodiments of the present disclosure, or the part contributing to the prior art, may be embodied in the form of a software product which is stored in a storage medium including a number of instructions such that a computer device (which may be a personal computer, a server, or a network device, etc.) performs all or part of the method described in each of the embodiments of the present disclosure. The foregoing storage medium includes: any medium that is capable of storing program codes, such as a USB disk, a mobile hard disk drive, a Read Only Memory (ROM), a magnetic disk or an optical disc, etc. In this way, the embodiments of the present disclosure are not limited to any particular combination of hardware and software.

Accordingly, the embodiments of the present disclosure further provide a computer storage medium storing a computer-executable instruction which, when being executed by a processor, implements the above-mentioned data transmission method according to the embodiments of the present disclosure.

Figure 6:
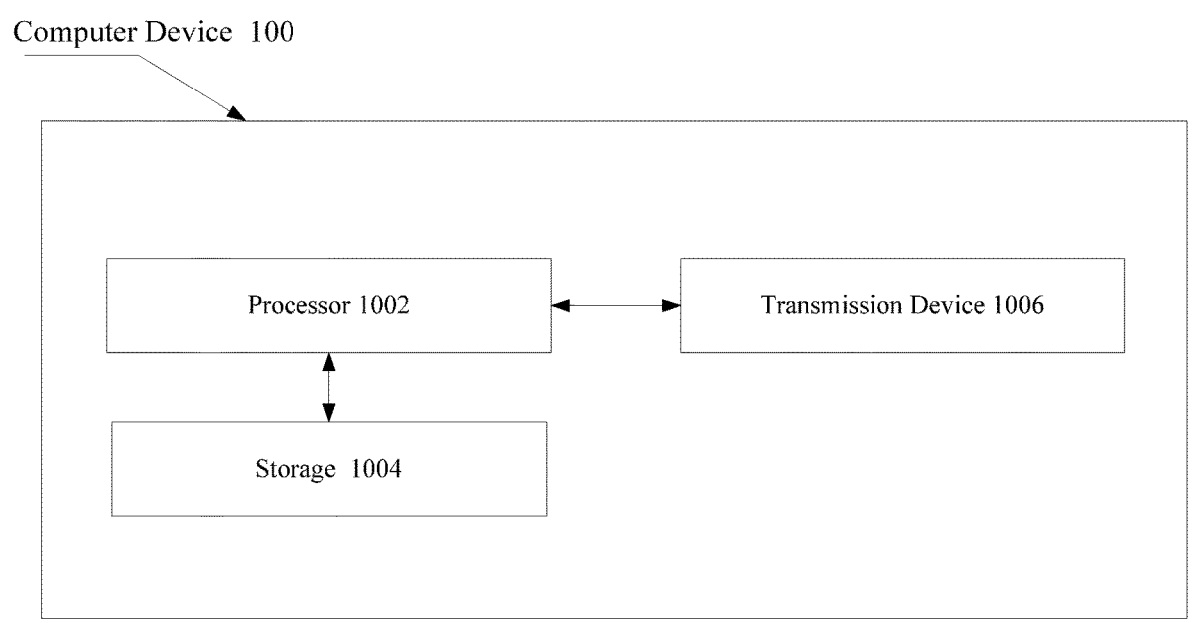
FIG. 6 is a schematic diagram of a structural composition of a computer device according to an embodiment of the present disclosure.

FIG. 6 is a schematic diagram of a structural composition of a computer device according to an embodiment of the present disclosure. The computer device according to the embodiment of the present disclosure may be either a terminal, or a network device. As shown in FIG. 6, the computer device 100 may include one or more (only one is illustrated in the drawings) processor 1002 (the processor 1002 may include, but is not limited to a Micro Controller Unit (MCU) or a processing means of a Field Programmable Gate Array (FPGA), or other processing device), a memory 1004 for storing data, and a transmission device 1006 for communications. Those of ordinary skills in the art will understand that the structure as shown in FIG. 6 is only schematic, and does not limit the structure of the electronic device described above. For example, the computer device 10 may also include more or fewer components than that shown in FIG. 6, or have different configurations than that shown in FIG. 6.

The memory 1004 may be configured to store software programs and modules of application software, such as program instructions/modules corresponding to the data transmission method in the embodiments of the present disclosure. The processor 1002 executes various functional applications and data processing by running the software programs and modules stored in the memory 1004, i.e., implements the above method. The memory 1004 may include a high-speed random memory and may also include a non-volatile memory such as one or more magnetic storage devices, flash memory, or other non-volatile solid-state memory. In some examples, the memory 1004 may further include a memory remotely disposed with respect to the processor 1002, which may be connected to the computer device 100 through a network. Examples of the above networks include, but are not limited to, the Internet, enterprise intranets, local area networks, mobile communication networks, and combinations thereof.

The transmission device 1006 is configured to receive or transmit data via one network. The specific example of the network described above may include a wireless network provided by a communication provider of the computer device 100. In one example, the transmission device 1006 includes a Network Interface Controller (NIC) that can be connected to other network devices through a base station so as to be able to communicate with the Internet. In one example, the transmission device 1006 may be a Radio Frequency (RF) module configured to communicate with the Internet wirelessly.

The technical solutions recorded in the embodiments of the present disclosure may be combined arbitrarily in case of no conflict.

In the several embodiments provided in the present disclosure, it should be understood that the disclosed methods and smart devices may be implemented in other ways. The device embodiments above are schematic only, for example, the division of units is only a logical function division, and there may be other division modes in actual implementation, for example: a plurality of units or components may be combined, or may be integrated into another system, or some features may be omitted or not executed. In addition, the shown or discussed mutual coupling or direct coupling or communication connection may be through some interfaces. The indirect coupling or communication connection between the devices or units may be electrical, mechanical or other forms.

The above-mentioned units illustrated as separated parts may be or may not be separated physically, and the parts displayed as units may be or may not be physical units. That is, the parts may be located at one place or distributed in multiple network units. Some or all of the units may be selected according to actual needs to achieve the objectives of the solutions in the embodiments.

In addition, each functional unit in each embodiment of the present disclosure may be integrated in one second processing unit, or each unit may exist alone physically, or two or more units may be integrated in one unit. The integrated units above may be implemented in the form of hardware, or in the form of hardware and software functional units.

The foregoing descriptions are merely detailed embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure.

What is claimed is:

1. A data transmission method, comprising:
receiving, by a network, data and attribute information corresponding to the data transmitted by a terminal; wherein, the attribute information corresponding to the data comprises at least one of Quality of Service (QoS) flow information, Protocol Data Unit (PDU) session information, network slice information, external network information for data transmission, and identification information of the terminal; and
establishing, or activating or modifying a path configuration of a core network according to the attribute information of the data, and transmitting the data to an external network based on the path configuration, by the network,
wherein the receiving, by the network, the data and the attribute information, corresponding to the data transmitted by the terminal comprises:
receiving, by an access network element, a first PDU transmitted by the terminal, the first PDU comprising: a first header and a second PDU, wherein, the first header comprises the attribute information corresponding to the data, and the second PDU comprises the data; and
parsing the attribute information corresponding to the data from the first header of the first PDU, encapsulating a third PDU and transmitting the third PDU to a core network element, by the access network element, the third PDU comprising: a second header and the second PDU; wherein, the second header comprises the attribute information corresponding to the data,
wherein the first PDU is a RRC PDU; the second PDU is a non-access stratum (NAS) PDU; and the third PDU is an $N_2$—C PDU.

2. A data transmission method, comprising:
receiving, by a network, data and attribute information corresponding to the data transmitted by a terminal; wherein, the attribute information corresponding to the data comprises at least one of Quality of Service (QoS) flow information, Protocol Data Unit (PDU) session information, network slice information, external network information for data transmission, and identification information of the terminal; and
establishing, or activating or modifying a path configuration of a core network according to the attribute information of the data, and transmitting the data to an external network based on the path configuration, by the network,
wherein the receiving, by the network, the data and the attribute information corresponding to the data transmitted by the terminal comprises:
receiving, by an access network element, a first PDU transmitted by the terminal, the first PDU comprising: a first header and a second PDU; wherein, the second PDU comprises the attribute information corresponding to the data and the data; and encapsulating a third PDU based on the first PDU and transmitting the third PDU to a core network element, by the access network element, the third PDU comprising: a second header and the second PDU, wherein the first PDU is a RRC PDU; the second PDU is a non-access stratum (NAS) PDU; and the third PDU is an $N_2$—C PDU.

3. A data transmission device, comprising:

a processor; and a memory for storing instructions executable by the processor;

wherein the processor is configured to:

receive data and attribute information corresponding to the data transmitted by a terminal;

wherein, the attribute information corresponding to the data comprises at least one of Quality of Service (QoS) flow information, Protocol Data Unit (PDU) session information, network slice information, external network information for data transmission, and identification information of the terminal; and establish, or activate or modify a path configuration of a core network according to the attribute information of the data, and transmit the data to an external network based on the path configuration, wherein the processor is further configured to:

receive a first PDU transmitted by the terminal, the first PDU comprising: a first header and a second PDU; wherein, the first header comprises the attribute information corresponding to the data, and the second PDU comprises the data; and parse the attribute information corresponding to the data from the first header of the first PDU, encapsulate a third PDU and transmit the third PDU to a core network element, the third PDU comprising: a second header and the second PDU; wherein, the second header comprises the attribute information corresponding to the data; and establish, or activate or modify the path configuration of the core network according to the attribute information of the data, and transmit the data to the external network based on the path configuration;

or, the processor is further configured to:

receive the first PDU transmitted by the terminal, the first PDU comprising: the first header and the second PDU; wherein, the second PDU comprises the attribute information corresponding to the data and the data; and encapsulate the third PDU based on the first PDU and transmit the third PDU to the core network element, the third PDU comprising: the second header and the second PDU; and establish, or activate or modify the path configuration of the core network according to the attribute information of the data, and transmit the data to the external network based on the path configuration, wherein the first PDU is a RRC PDU; the second PDU is a non-access stratum (NAS) PDU; and the third PDU is an $N_2$—C PDU.

* * * * *